United States Patent [19]

Trinh et al.

[11] 4,398,925
[45] Aug. 16, 1983

[54] ACOUSTIC BUBBLE REMOVAL METHOD

[75] Inventors: Eugene H. Trinh, Los Angeles; Daniel D. Elleman, San Marino; Taylor G. Wang, Glendale, all of Calif.

[73] Assignee: The United States of America as represented by the Administrator of the National Aeronautics and Space Administration, Washington, D.C.

[21] Appl. No.: 341,406

[22] Filed: Jan. 21, 1982

[51] Int. Cl.³ .............................................. B01D 19/00
[52] U.S. Cl. ............................................. 55/15; 55/38; 55/52; 55/277; 65/134; 366/114; 252/361; 210/748
[58] Field of Search ...................... 55/15, 87, 178, 277, 55/36, 38, 52; 65/134; 366/114; 210/748; 252/361

[56] References Cited

U.S. PATENT DOCUMENTS

| | | | |
|---|---|---|---|
| 2,578,505 | 12/1951 | Carlin | 366/114 |
| 2,620,894 | 12/1952 | Peterson et al. | 55/15 |
| 3,151,958 | 10/1964 | Bodine | 55/15 |
| 3,284,991 | 11/1966 | Ploeger et al. | |
| 3,371,233 | 2/1968 | Cook | 366/114 |
| 3,429,743 | 2/1969 | Branson | |
| 3,761,732 | 9/1973 | Ratcliff | 55/277 |
| 3,853,500 | 12/1974 | Gassmann et al. | 55/277 |
| 3,904,392 | 9/1975 | Vaningen et al. | |
| 4,127,394 | 12/1977 | Verhille | |
| 4,205,966 | 6/1980 | Horikawa | 55/15 |
| 4,316,734 | 2/1982 | Spinosa et al. | 55/15 |
| 4,339,247 | 7/1982 | Faulkner et al. | 55/277 |

OTHER PUBLICATIONS

Sound Breaks Foam Barrier, Chemical Week, May 6, 1961, pp. 51 and 52.

Primary Examiner—David L. Lacey
Attorney, Agent, or Firm—Paul F. McCaul; John R. Manning; Thomas H. Jones

[57] ABSTRACT

A method is described for removing bubbles (14) from a liquid bath (12), such as a bath of molten glass to be used for optical elements. Larger bubbles are first removed by applying acoustic energy resonant to a bath dimension (H) to drive the larger bubbles toward a pressure well (30) where the bubbles can coalesce and then be more easily removed. Thereafter, submillimeter bubbles (50) are removed by applying acoustic energy of frequencies resonant to the small bubbles to oscillate them and thereby stir liquid immediately about the bubbles to facilitate their breakup and absorption into the liquid (16).

10 Claims, 3 Drawing Figures

ACOUSTIC BUBBLE REMOVAL METHOD

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The removal of bubbles from baths of liquid, is required in many industrial operations, to avoid the impairment of optical and strength properties of the finished products. One method described in U.S. Pat. No. 3,853,500 by Gassmann involves the application of acoustic energy resonant to a dimension of a liquid bath, to urge bubbles towards a node of the acoustic standing wave pattern where the bubbles coalesce. This technique is primarily useful in coalescing larger bubbles such as those above a millimeter in diameter, but is not as useful in removing submillimeter size bubbles. In addition, considerable time may be required for coalesced bubbles to float to the top of the bath, especially where the liquid in the bath is very viscous. In one specialized technique wherein the liquid is under zero gravity conditions (in outer space), the bubbles will not float to the surface.

In another technique, described in U.S. Pat. No. 4,205,966 by Horikawa, acoustic energy is applied to a bath to vibrate it, to help dissolve bubbles into the liquid of the bath. While this technique can help dissolve small bubbles, it still requires an inordinately long period of time to absorb such bubbles. Such a long period for absorption applies especially to bubbles in the range of 50 microns to 1000 microns. Such bubbles are too small to be easily moved together to coalesce, require very long term vibration of the bath to become dissolved therein, and yet are large enough to seriously affect the qualities of many products. A technique which enabled more rapid removal of bubbles of a wide range of sizes and under a variety of conditions including zero gravity conditions, would be of considerable value.

SUMMARY OF THE INVENTION

In accordance with one embodiment of the present invention, methods are provided for removing gas bubbles from liquid baths by the application of acoustic energy to the bath, which enable a more rapid and complete removal of bubbles. One method includes first removing the larger bubbles by applying acoustic energy resonant to a bath dimension, to drive bubbles towards a pressure well where they can coalesce for easier removal. Smaller bubbles of submillimeter size can be broken up and/or dissolved by applying acoustic energy of frequencies which are resonant to the bubbles. The resonant frequencies create bubble oscillations which can help break them up, and which cause microscopic stirring of liquid immediately around the bubbles to enhance their dissolution into the liquid.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
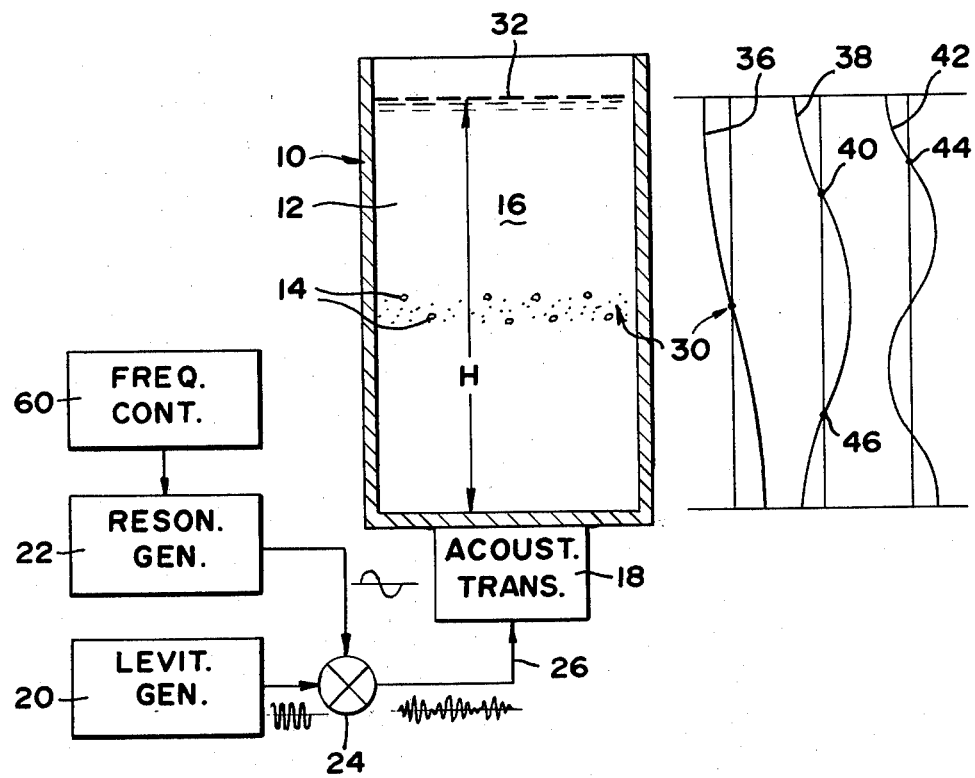
FIG. 1 is a simplified block diagram and elevation view of a system of the invention which can perform the gas bubble removal method of the invention.

FIG. 1 illustrates a container 10 which holds a bath 12 of a liquid that contains numerous bubbles 14 of a wide range of sizes. The particular liquid 16 of the bath is, in one example, composed of molten glass which will be used to cast optical elements that must be devoid of bubbles of appreciable size. Bubble removal is accomplished by applying acoustic energy to the bath 12 by an electrically drivable acoustic transducer 18. The transducer can be energized by the separate or combined outputs of two oscillators or generators 20, 22 whose outputs pass through a mixer 24 to the input line 26 of the transducer.

In a first step for removal of gas bubbles in the liquid, only the first or levitation generator 20 is operated, to drive the transducer 18 at a frequency which is resonant to the height of the liquid bath 12. When a lowest mode is applied, with a wavelength twice the height H of the bath, a standing wave pattern is produced which has a pressure well at the location 30 which is halfway between the bottom and top of the bath. The pressure produced by the standing wave pattern pushes the bubbles towards the pressure well, where they coalesce to form larger bubbles. The rate of movement of the bubbles depends on many factors including the viscosity of the liquid 16 and the sizes of the bubbles. It also depends upon the initial locations of the bubbles, since the pressure gradient is greatest at a height of about one-quarter and three-quarters of the total height of the bath, when the lowest acoustic mode is applied which has a single pressure well at 30. It is usually possible to move larger bubbles of a diameter slightly less than one millimeter, or greater, by the acoustic pressure. As the bubbles approach the pressure well 30 and encounter other bubbles with which they merge, progressively larger bubbles are created which are easier to remove.

In many applications, removal of the large bubbles can be accomplished by merely de-energizing the transducer 18, and allowing the bubbles to float to the upper surface 32 of the bath where they enter the atmosphere. Where the liquid is very viscous, removal of the large bubbles can be speeded up by applying other resonant modes to the liquid bath. While the first mode, whose wavelength is indicated by the graph 36 has only a single pressure well 30, a second mode 38 can be applied which has two pressure wells including one at 40. If the coalesced bubbles are slightly above the initial pressure well 30, the frequency of the levitation generator 20 can be switched to the second mode, to urge the coalesced bubbles to the next pressure well 40. After the coalesced bubbles have passed the well 40, the frequency can be switched to a third acoustic mode with a wavelength indicated at 42, which has a pressure well at 44, to more rapidly drive the bubbles upwardly. Additional modes can be applied to raise the bubbles progressively higher in the liquid.

The higher modes such as the second one indicated at 38, which has two pressure wells at 40 and 46, also can be useful in more rapidly agglomerating bubbles in the vicinities of these pressure wells, so that larger bubbles are created that can be more easily removed.

The use of progressive resonant acoustic modes to move agglomerated bubbles, can be especially useful in applications under nearly zero gravity conditions. Zero gravity conditions produced on a spacecraft, are useful in mixing certain ingredients in glass, which cannot be mixed under earth gravity conditions. Since gravity is not available to remove the bubbles produced in the molten glass, the use of successively higher modes to move the bubbles can be useful in removing the agglomerated bubbles. Other techniques for bubble removal can be employed, such as by inserting a small pipe into the pressure well region to withdraw the gas form the bubbles, but such a technique can be cumbersome, especially where there are still a large number of bubbles left, even though they are of larger than initial size. It may be noted that the container 10 can be of rectangular, circular, or other cross-section, and additional acoustic modes perpendicular to the height H can be applied. It is even possible to utilize a spherical container.

The smaller bubbles of submillimeter size, in the range of about 50 microns to about 1000 microns, are often considered the most troublesome, because they cannot be readily removed by acoustic agglomeration and yet are large enough to interfere with the properties of the finished material such as the optical properties of optic elements. In accordance with another aspect of the invention, these submillimeter bubbles are removed by applying acoustic energy to the liquid of frequencies that are resonant to the bubbles. This causes oscillations of the bubbles that produces rapid flow of liquid immediately about each bubble, to produce rapid dissolving of gas in the bubble into the liquid of the bath. The oscillations also can be useful in breaking up the larger of these bubbles into smaller ones that can be more readily dissolved into the liquid. It may be noted that very small bubbles of less than about 50 microns diameter cannot be readily oscillated because they are so "stiff," but such bubbles are not of large deleterious effect in the final product.

Figure 2:
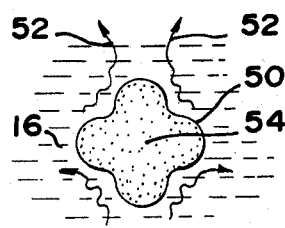
FIG. 2 is a magnified elevation view of a bubble in the bath of FIG. 1, showing it undergoing oscillations.

FIG. 2 is a greatly enlarged illustration of a bubble 50 lying in the environment of liquid 16, which is subjected to acoustic energy of a frequency which matches a resonant frequency of the bubble. This produces oscillations of the bubble so that its height and width undergo rapid changes. The result is that liquid immediately around the bubble travels in paths such as those indicated at 52, which results in rapid mixing movement of liquid immediately around the bubble. The gaseous material 54 in the bubble 50 can dissolve in the surrounding liquid 16, but dissolves only very slowly. In the absence of bubble oscillations, the liquid immediately adjacent to the bubble surface becomes saturated with the bubble gas 54, so that additional dissolving of gas out of the bubble depends upon migration of the liquid away from the liquid-bubble interface. The acoustic-caused oscillations of the bubble, which stirs liquid immediately around the bubble, greatly speeds up the removal of gas-saturated liquid immediately around the bubble to greatly increase the speed at which the gas in the bubble dissolves in the liquid. Tests have been conducted wherein microscopic dye particles have been introduced into a liquid bath and oscillations applied, to map the paths indicated at 52 which such microscopic dye particles undergo, to determine the paths of liquid immediately around the oscillating bubbles.

Figure 3:
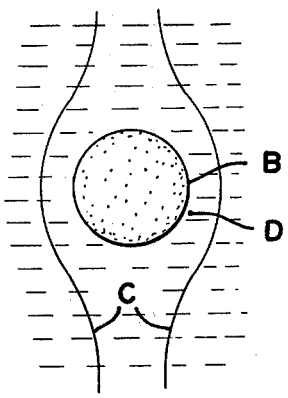
FIG. 3 is a magnified elevation view of a bubble in a bath agitated by techniques of the prior art.

In the prior art, sonic energy has been applied to liquid baths in attempts to dissolve bubbles therein. However, such sonic energy has not been primarily of frequencies that are resonant to the bubbles, so that they caused only macroscopic mixing of the liquid, which is somewhat similar to the mixing that occurs when a spoon is used to stir a glass of liquid. Such a situation is shown in FIG. 3, wherein a bubble B is shown immersed in a liquid, wherein moving liquid flows along paths C that deflect around the bubble B and produce very little movement at locations such as D that are immediately adjacent to the gas-liquid interface at the periphery of the bubble. By contrast, the oscillations of the bubbles themselves, in the manner illustrated in FIG. 2, produces rapid movement of liquid immediately adjacent to the gas-liquid interface, to produce gas dissolution at rates much higher than those produced by the technique indicated in FIG. 3.

The resonant frequency of a bubble depends to a large extent upon the surface tension of the liquid and the size of the bubble. For water, the resonant frequency for shape oscillations of bubbles of 1000 microns (one millimeter) is about 500 Hz, while the resonant frequency for bubbles of 50 microns is about 40 kHz. In order to dissolve bubbles in the range of about 50 to 1000 microns, the transducer 18 of FIG. 1 is energized with a frequency that sweeps through the range of about 0.5 kHz to 40 kHz. The sweep rate should be slow enough so that each bubble oscillates at least several cycles. The Q of a bubble, which is a ratio of the center frequency of oscillation to the bandwidth over which the amplitude oscillations are within 3 db of that attained at the center frequency, is typically about 10 to 1000 for air bubbles dissolved in water.

Thus, the frequency should be swept slow enough so that the acoustic energy is within the 3 db band during at least a few oscillations of the bubble. We have found that most of the bubbles of 50 microns to 1000 microns diameter can be removed from a water bath by sweeping between 0.5 kHz and 40 kHz during a period of ten seconds, and repeating the sweep about 100 times during a period of about 15 minutes. The Q of a bubble becomes lower as the viscosity of the liquid increases, and then a lower sweep rate is required. Of course, a low sweep rate can be used in any case.

In FIG. 1, the bubble resonant frequency is obtained from a resonant generator 22 whose output is delivered through a mixer 24 to the transducer 18. It would be possible to utilize only the resonant generator 22, but transducers are typically most efficient near a particular frequency. An easily available transducer which was used in experiments, included a piezoelectric disc of about 4 inches diameter and one inch thickness, and had greatest efficiency at about 60 kHz. To optimize the use of the transducer, the levitation generator 20 was used to generate a 60 kHz signal, which was modulated in the mixer 24 by the output of the resonant generator 22 which was swept from 0.5 kHz to 40 kHz. A voltage controlled oscillator can be used for the generator 22, whose frequency is controlled by the voltage output of a frequency controller 60. The transducer 18 was driven to produce a maximum output of about 160 db.

As discussed above, these intense oscillations can cause breakup of the larger bubbles within the submillimeter range of interest, and cause dissolving of gas out of these and smaller bubbles. Bubbles less than about 50 micron diameter do not oscillate because of the high stiffness, but this is not of great importance because such bubbles constitute a small volume of the material and their small size results in very little effect on the final product.

Thus, the invention provides a method and apparatus for removing bubbles from a liquid bath, which enables removal of a high proportion of the gas bubble volume within a moderate amount of time. Initially, large bubbles are removed by applying acoustic energy resonant to the bath, or at least to one dimension thereof, to coalesce the larger bubbles at a pressure well of the resulting standing wave pattern, so that larger bubbles are created that can be more easily removed. The bubbles can be completely removed from the bath, or at least moved to one side so the rest of the bath is devoid of large bubbles. The removal of such large bubbles helps avoid saturation of the bath liquid with bubble gas, to aid in dissolving gas of smaller bubbles into the liquid. Smaller bubbles such as in the range of 50 to 1000 microns, can be removed by applying acoustic energy of frequencies that are resonant to the bubbles to cause them to oscillate. This can produce microscopic stirring of the liquid immediately adjacent to the gas-liquid interface at the periphery of the bubbles, to more rapidly dissolve the bubble gas into the liquid.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A method for removing gas bubbles, including larger bubbles and smaller bubbles, from a bath of liquid, comprising:
   first removing the larger bubbles by applying acoustic energy of a mode which is resonant to a bath dimension to drive bubbles toward a pressure well of the mode to at least partially coalesce them so as to form the larger bubbles, and then removing the coalesced larger bubbles;
   thereafter dissolving the smaller bubbles that remain in the liquid of the bath, by applying acoustic energy of frequencies which are resonant to the smaller bubbles to create bubble oscillations and consequent microscopic stirring of liquid immediately around the smaller bubbles.

2. The method described in claim 1 wherein:
   said step of dissolving includes applying a variable frequency which is swept through a frequency range wherein the highest frequency is more than ten times the lowest frequency.

3. The method described in claim 1 wherein:
   said step of applying acoustic energy of frequencies which are resonant to the smaller bubbles includes applying acoustic energy within a range of frequencies which resonate bubbles in said liquid lying in the range of diameters of 50 microns to 1000 microns.

4. The method described in claim 1 wherein:
   said step of applying acoustic energy resonant to a bath dimension includes applying a succession of different modes resonant to the bath dimensions, with successive modes having pressure wells progressively closer to a surface of said bath.

5. A method for removing gas bubbles from a bath of liquid which has at least a predetermined surface comprising:
   applying acoustic energy of successive modes which are each resonant to a dimension of the bath, to drive bubbles toward pressure wells of the modes, with successive modes having pressure wells progressively closer to said predetermined surface of said bath, whereby to establish a zone extending through most of the bath that is free of large bubbles.

6. The method described in claim 5 wherein:
   said predetermined surface to which the pressure wells of successive modes are progressively closer faces a gaseous environment.

7. A method for dissolving gas bubbles of predetermined size in a bath of liquid of known density and viscosity in which the bubbles lie, comprising:
   applying acoustic energy to said liquid bath of a frequency that is resonant to said bubbles so as to cause bubble oscillations and consequent microscopic stirring of the liquid immediately around the bubbles which causes gas in the bubbles to dissolve in the liquid.

8. The method described in claim 7 wherein:
   said bubbles vary in size and said step of applying includes varying the frequency of said acoustic energy over a frequency range wherein the highest frequency is more than ten times the lowest.

9. The method described in claim 8 wherein:
   said bath contains bubbles of a size between about 50 microns and 1000 microns diameter in a quantity that significantly affects the utility of said bath, and the lowest frequency is about 0.5 kHz and the highest is about 40 kHz whereby to remove bubbles in a range of diameters of about 50 microns to 1000 microns.

10. The method described in claim 7 wherein:
    said step of applying acoustic energy includes modulating a high frequency electrical signal with a lower second signal of said frequency which is resonant to said bubbles.

* * * * *